(12) United States Patent
Dixon et al.

(10) Patent No.: US 10,949,862 B1
(45) Date of Patent: Mar. 16, 2021

(54) SERVICE REPRESENTATIVE AND REMOTE LOCATION DOCUMENT COMMUNICATION

(71) Applicant: United Services Automobile Association (USAA), San Antonio, TX (US)

(72) Inventors: David P. Dixon, Boerne, TX (US); Robert J. Haines, San Antonio, TX (US); John P. Hyltin, San Antonio, TX (US); Peter H. McKenna, San Antonio, TX (US); Bharat Prasad, San Antonio, TX (US); Brady Carl Stephenson, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/571,278

(22) Filed: Sep. 16, 2019

Related U.S. Application Data

(63) Continuation of application No. 15/665,972, filed on Aug. 1, 2017, now Pat. No. 10,521,803, which is a continuation of application No. 15/205,219, filed on Jul. 8, 2016, now Pat. No. 9,741,041, which is a continuation of application No. 14/925,489, filed on Oct. 28, 2015, now Pat. No. 9,390,421, which is a continuation of application No. 13/280,176, filed on Oct. 24, 2011, now Pat. No. 9,183,536.

(60) Provisional application No. 61/406,030, filed on Oct. 22, 2010.

(51) Int. Cl.
*G06Q 10/10* (2012.01)
*G06Q 30/00* (2012.01)
*H04L 29/08* (2006.01)

(52) U.S. Cl.
CPC .......... *G06Q 30/016* (2013.01); *G06Q 10/10* (2013.01); *H04L 67/06* (2013.01); *H04L 67/125* (2013.01); *H04L 67/141* (2013.01)

(58) Field of Classification Search
CPC .............................. G06Q 30/016; G06Q 10/10
USPC ......................................................... 705/304
See application file for complete search history.

(56) References Cited

U.S. PATENT DOCUMENTS

| | | | |
|---|---|---|---|
| 8,756,125 B1 * | 6/2014 | Goode | G06Q 40/123 705/31 |
| 8,842,156 B1 * | 9/2014 | Alekhin | G07F 17/16 348/14.02 |
| 2002/0044691 A1 * | 4/2002 | Matsugu | G06K 9/20 382/218 |
| 2002/0196478 A1 | 12/2002 | Struble | |
| 2004/0021895 A1 * | 2/2004 | Lay | H04N 1/00209 358/1.15 |

(Continued)

FOREIGN PATENT DOCUMENTS

GB          2404053         1/2005

*Primary Examiner* — Thomas J Lett
(74) *Attorney, Agent, or Firm* — Fish & Richardson P.C.

(57) ABSTRACT

The present disclosure provides apparatus, systems, and methods for service representative and remote location document communication. One or more embodiments include a memory, and a processor configured to execute executable instructions stored in the memory to identify a remote location of a customer, identify a type of device available to be utilized at the remote location, and provide to the device at the remote location instructions for capturing information from a document.

17 Claims, 2 Drawing Sheets

(56) References Cited

U.S. PATENT DOCUMENTS

| | | | |
|---|---|---|---|
| 2004/0227979 A1* | 11/2004 | Chen | H04N 1/00347 358/474 |
| 2007/0088640 A1 | 4/2007 | Hyakutake et al. | |
| 2007/0291289 A1* | 12/2007 | Kuo | H04N 1/6055 358/1.9 |
| 2009/0175491 A1 | 7/2009 | Charpentier | |
| 2009/0190157 A1 | 7/2009 | Fertlitsch | |
| 2009/0316174 A1 | 12/2009 | Kurahashi | |
| 2010/0238194 A1 | 9/2010 | Roach, Jr. | |
| 2011/0045807 A1 | 2/2011 | Issa et al. | |
| 2014/0028866 A1 | 1/2014 | Miyachi | |
| 2014/0058940 A1* | 2/2014 | Ebbert | G06Q 20/108 705/42 |
| 2016/0132848 A1* | 5/2016 | Narendra | G06Q 20/042 705/42 |

\* cited by examiner

SERVICE REPRESENTATIVE AND REMOTE LOCATION DOCUMENT COMMUNICATION

FIELD OF DISCLOSURE

The present disclosure relates to service representative and remote location document communication.

BACKGROUND

Service representatives in some industries sometimes have to communicate documents or information thereon between their location and a remote location at which the documents are located. For example, banking customers often need or desire the interaction with a customer service representative to aid them in doing a transaction.

In many instances, the best interaction is in-person; however, sometimes in-person communication is not possible. In such situations, often the customer contacts the company via a telephone and transacts business in that manner. However, in some circumstances, it may be difficult to transact business in this manner, such as when documents have to be passed between the customer and the company, such as in a mortgage transaction or automobile purchase.

This can be problematic for a number of reasons. For instance, there may be no way to transmit the documents between the customer and service representative, the customer may not be skilled enough to operate a communication device, or the documents are received by the company, but not sent directly to the service representative thereby slowing the transaction down, among other issues.

DETAILED DESCRIPTION

The present disclosure provides apparatus, systems, and methods for service representative and remote location document communication. Embodiments disclosed herein can facilitate the use of multiple service representatives to be able to service a particular customer as the location can be identified and executable instructions can be used to gain functionality of the devices located at the remote location. Additionally, executable instructions, in some embodiments, can be used to direct documents or information captured by a device at the remote location directly to the service representative working with that particular customer thereby speeding up the transaction, among other benefits.

In some embodiments, the service representative can be allowed to control one or more functions of a device located at a remote location from where the service representative is located. This can be beneficial, for example, in some situations because the customer need not understand how to use the device to transmit a document.

For instance, elderly, non-technically savvy, blind, or customers who cannot read instructions on operating a device may benefit from such embodiments.

Further, in some embodiments, this control can be established without involvement of the service representative or the customer so that neither party has to be skilled in device connectivity or network communication.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

It will be understood that the computing systems and the computing system components of the present disclosure, as generally described and illustrated in the figures herein, may be arranged and designed in a wide variety of different configurations. Thus, the following description of the present disclosure is not intended to limit the scope of the disclosure, but is representative of one or more embodiments of the disclosure.

Figure 1:
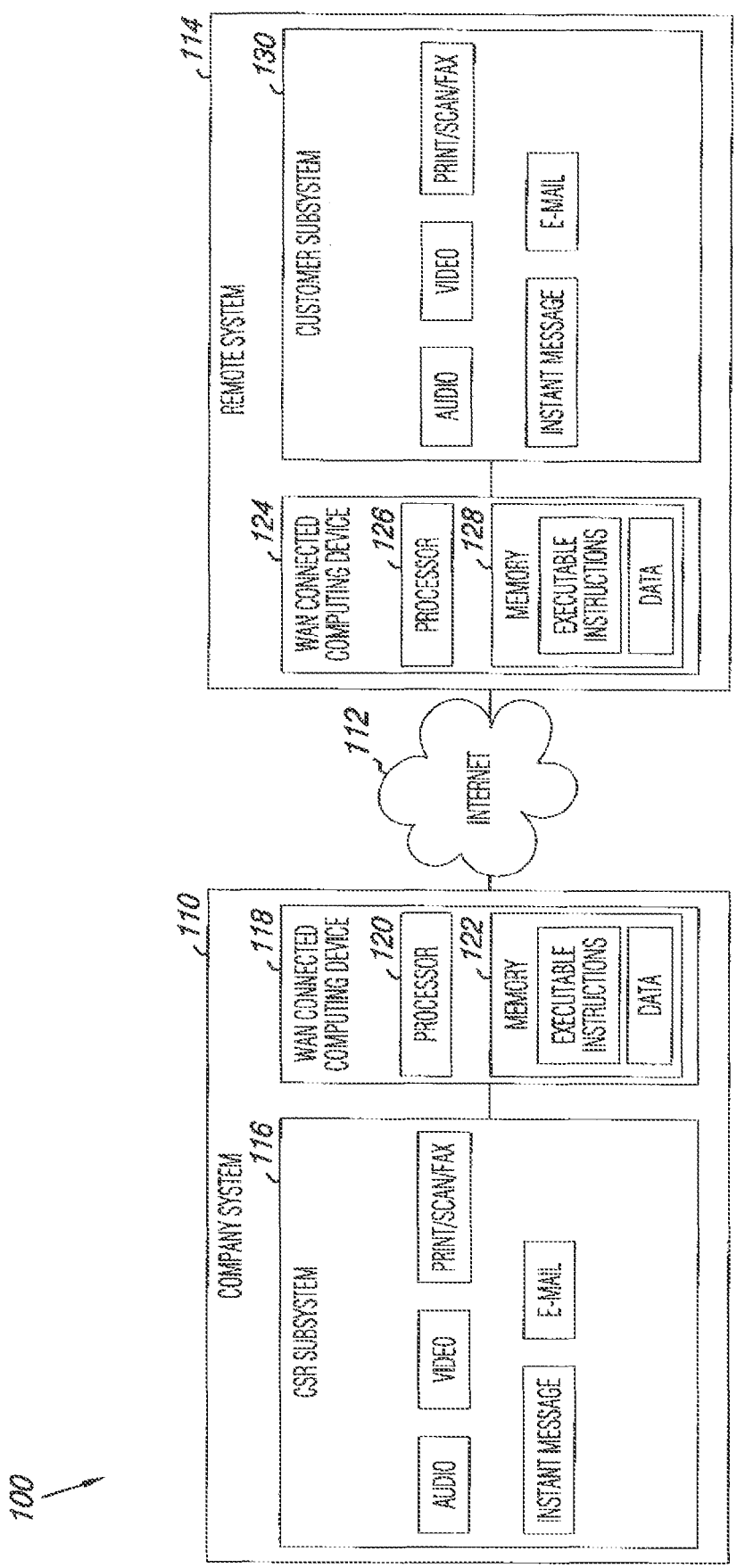
FIG. 1 illustrates a communication structure that can be utilized according to one or more embodiments of the present disclosure.

FIG. 1 illustrates a communication structure that can be utilized according to one or more embodiments of the present disclosure. In the embodiment illustrated in FIG. 1, the structure 100 includes a company communication system 110 and a remote communication system 114. In some embodiments, communications between these systems can include audio, video, printing, scanning, faxing, instant messaging, e-mailing, and/or other communications types.

In the embodiment illustrated in FIG. 1, the company communication system 110 includes a Customer Service Representative (CSR) subsystem 116. The CSR subsystem is utilized to conduct a communication session with a customer at a remote location.

In some embodiments, the company communication system 110 could have multiple CSR subsystems, for example, wherein each service representative has a computing device. The computing device may include or be connected to other devices having audio, video, print, scan, fax, instant message, and/or e-mail functionalities among other functions.

For example, in some embodiments, the computing device may have a camera and microphone integrated into the device and in some embodiments, such functionalities can be provided by a separate camera and/or microphone attached to the computing device either directly (wired or wirelessly), or indirectly (e.g., via a network). Accordingly, in some embodiments, some components of the system 110 can be shared between CSR's, such as the printer or fax machine.

The company system 110 can also include a Wide Area Network (WAN) connected computing device 118. Such a device can be used to send and receive information via a WAN, such as the Internet 112, as illustrated in the embodiment of FIG. 1, and/or other types of WANs (e.g., an intranet). Such devices can include one or more processors 120 and memory 122.

Memory 122 can be used to store executable instructions that can be executed to provide the functionalities described herein and can store data to be utilized by the executable instructions or for other reasons. For example, executable instructions can be utilized to identify a location of a customer, identify the type of device available to be utilized at a remote location and can be used to provide (e.g., to the device at the remote location) instructions for capturing information from a document (e.g., the document image, or information derived from an image), among other functions. In some embodiments, the device providing one or more of the functionalities of the CSR subsystem 116 may be the WAN connected computing device 118.

As one of ordinary skill in the art will appreciate, a computing device may include a processor in communication with one or more memory storage locations and may include electronic chips having hardware logic, e.g. application specific integrated circuits (ASICs), associated with one or more ports. Embodiments of the various computing devices are not limited to a number, type, or size of processor or memory resources.

Computer executable instructions may reside on the various computing devices. For example, computer executable instructions in the form of firmware and/or software may be resident on a network within the company communication system 110, in the memory of a service representative's computing device, a network management station and/or one or more routers, hubs, and/or switches, and may be executable by the processor(s) and/or logic thereon. Also, computer executable instructions may be resident in a number of locations on various computing devices in the network as may be employed in a distributed computing network.

As used in this disclosure, a "distributed computing network" means the use of multiple computing devices in a network to execute various roles in executing instructions, as described herein. "Software", as used herein, may include a series of executable instructions that may be stored in memory and executed by the hardware logic of a processor (e.g., transistor gates) to perform a particular task. Memory, as the reader will appreciate, may include random access memory (RAM), read only memory (ROM), and may be stored on any suitable medium such as non-volatile memory (such as Flash memory), hard disks, memory circuitry, etc., which can store instructions executable on the processor and data to be used by the instructions.

Embodiments of the present disclosure may be performed by software, hardware in the form of logic, and/or applications, e.g. a self-contained hardware and/or software component that interacts with a larger system, on a computing system and/or system components thereof shown herein or otherwise known to those of ordinary skill in the art. A software application may come in the form of a file and handle a specific task within a larger software system.

For the present disclosure any suitable computer-usable or computer-readable medium may be utilized. Examples of the computer-usable or computer-readable medium include, but are not limited to, an electronic, magnetic, optical, electromagnetic, or semiconductor device.

More specific examples of the computer-readable medium include, but are not limited to, the following: a portable computer diskette, a hard disk, an erasable programmable read-only memory (EPROM or Flash memory), a portable compact disc read-only memory (CD-ROM), an optical storage device, a transmission media such as those supporting the Internet or an intranet, logic programmed into hardware, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. A computer-usable or computer-readable medium may be any medium that contains, stores, communicates, or transports computer-executable instructions for use by or in connection with communication structure 100.

The computer-readable medium may be transitory or the computer-readable medium may be non-transitory. The computer executable instructions may be transmitted using any appropriate medium, including but not limited to the Internet, wire line, optical fiber cable, RF, etc.

In the embodiment illustrated in FIG. 1, the company communication system 110 includes multiple devices for providing the various functionalities described. The WAN connected computing device can be utilized to provide a number of functions for the company communications system 110. For example, the device 118 can be used to send and receive instructions from the remote system 114 and/or can be used to store data (e.g., identification information, location information, etc.)

This information can be part of a database and/or can be received from the remote system 114. For example, in some embodiments, the company communication system 110 can include a table of location information and/or device information for those locations.

For instance, a banking location (e.g., a brick and mortar bank, a location in a retail/grocery store, etc.) may have an area that includes a camera, microphone, printer, scanner, fax machine, and/or a computing device that can be used by a customer to conduct a communication session with a CSR. In such an arrangement, the company communication system may have data stored in memory that provides executable instructions for connecting a session between a CSR (e.g., device 118) and a customer (e.g., the camera, microphone, printer, scanner, fax machine, and/or computing device used by the customer) at that particular remote location and instructions.

Some embodiments may also include data regarding how the company communication system can establish control over one or more of the devices to facilitate capture of a document or information from a document. Some embodiments can also include instructions for forwarding that information or captured document data to the company communication system.

In some embodiments, control can be provided such that the customer need only place the document up to the camera or onto the scanner or fax machine and the CSR or the company communications system can adjust the characteristics of the image capture to ensure they capture the information needed from the document. Such an embodiment can be particularly beneficial when dealing with customers that have little technical know-how, customers that may not speak the language of the CSR, or customers that may not be able to read directions for operation of the device.

The remote system 130 of the embodiment of FIG. 1 also includes a WAN connected computing device 124 and includes a customer subsystem 130. The WAN connected computing device 124 includes a processor 126 and memory 128 that can store executable instructions and data as discussed herein with respect to the processor and memory of device 118. In various embodiments, the functionalities of elements 124 and 130 can be provided by a single device or by multiple devices.

Figure 2:
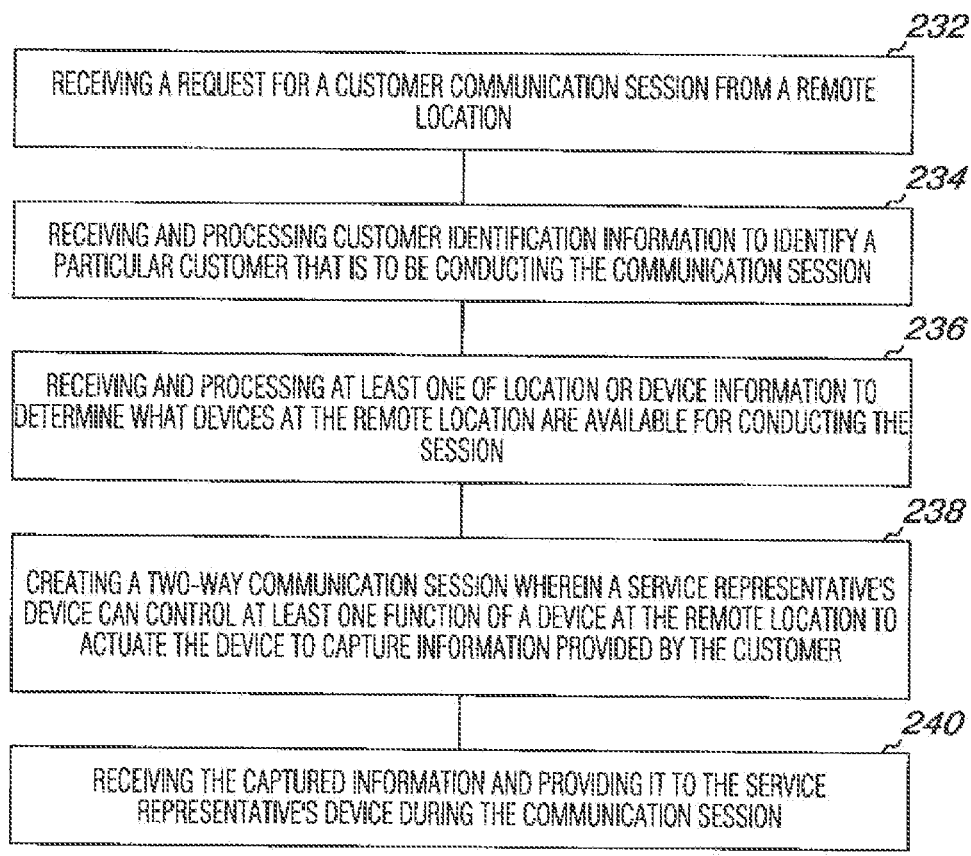
FIG. 2 illustrates a method of transacting business between a service representative and the customer according to an embodiment of the present disclosure.

FIG. 2 illustrates a method of transacting business (e.g., communicating a document) between a service representative and a customer at a remote location according to an embodiment of the present disclosure.

In block 232, the method of FIG. 2 includes receiving a request for a customer communication session from a remote location. The method also includes receiving and processing customer identification information to identify a particular customer that is to be conducting the communication session at block 234. In some embodiments, the information received can be received with the request.

The method of FIG. 2 also includes receiving and processing at least one of location or device information to determine what devices at the remote location are available for conducting the session in block 236. As discussed above with respect to the customer identification information, in some embodiments, the information received can be received with the request or the information of elements 234 and 236 can be received together, in some embodiments.

A two-way communication session can be created wherein a service representative's device can control at least one function of a device at the remote location to actuate the device to capture information provided by the customer as illustrated at block 238. The method of FIG. 2 also includes receiving the captured information and providing it to the service representative's device during the communication session at block 240.

The method of FIG. 2 may be better visualized using an example communication system. In this example, the company communication system has many CSR's that service customers. The customer arrives at a remote location that is equipped with a camera, microphone, printer, and scanner (e.g., an all in one print/scan/fax device would be one suitable device).

A communication session is initiated between a customer and a CSR. In some embodiments, the nature of the matter can be determined and the session request can be directed to a special CSR that handles those particular matters (e.g., mortgage specialist rather than a general banking CSR). This can be accomplished in any suitable manner such as answering one or more questions initiated by a computing device located at the remote location or in discussion with an initial CSR that may route the session elsewhere once the nature of the matter is known.

The company communication system and/or the CSR can receive information to aid in the creation of the communication session. For example, information regarding the remote location can be received. For instance, this information can be the branch number of the bank, address, phone number or IP address from which the communication is originating, or other identifying information that can be provided by the remote location, the customer, or inherent in the communication received.

In some embodiments, information about the customer can also be obtained via the communication. This can include their location or one or more device types if they are using a portable device or an at home computing device. Some or all of such information can be provided before the communication begins (e.g., at the time the individual becomes a customer of a bank), or during the communication either by conveying the information in the session or some information may be inherent in the communication type or information provided by the remote device.

In some embodiments, such as if the customer is located at a bank branch, the information about the device types available at the branch can be stored within the company communication system and can be looked up by executable instructions. This can also occur if the customer has previously provided their device information and it has been stored in memory.

In some embodiments, this information can be used to identify executable instructions stored on the company communication system or at the remote system that can be used to allow the CSR to control one or more devices or functionalities thereof to capture a document or information thereon. For example, the information can provide the model number or serial number of the scanner located at the remote location and instructions can be stored that can be executed to allow instructions from the CSR to be executed by the scanner, such as to change resolution, crop an area, change exposure, black and white or color selection, single side, double side, and other such functions.

Another example would provide for a CSR to print a document directly to a printer at the remote location. This may be beneficial in getting documents to the customer (e.g., copy of the title to a vehicle) or providing documents needing signature. Such embodiments allow the transaction to continue in real time or in near real time as documents are shared between the parties.

This can also be accomplished on a mobile device where the customer has granted the CSR or company the ability to control their device during a transaction. In such embodiments, the device may be controlled by the CSR to take an image of a document to capture the document or information thereon or to take an image of something like damage to an automobile and create an image document to be sent to the CSR.

In some embodiments, executable instructions can be utilized to route the captured image information directly to the CSR. In such embodiments, a direct two-way communication session is created allowing information to flow quickly between the CSR and the customer. This can be accomplished in any suitable manner.

For example, a header or code (e.g., alpha numeric code) can be added to the image information that includes routing information and/or information about the origin of the image information. This routing or origin information can be read by executable instructions and the communication can be directed to the particular CSR conducting the communication session based on, for example, CSR identification information for that particular CSR or a session identifier among other methods. Such embodiments can be utilized to provide real time or near real time document exchange which can increase the speed of such transactions and may allow for transactions to be accomplished that previously have not been able to be accomplished remotely.

In various embodiments, executable instructions can be provided to initiate the monitoring of incoming communications from the remote location. Once received, these communications can be forwarded to the CSR conducting the communication session to minimize delay in getting the documentation to the CSR. In some embodiments, if a physical document still needs to be sent to the CSR, executable instructions can be provided to pause the communication session until the documents arrive in the CSR's hands.

In some such embodiments, a routing cover sheet with applicable routing information can be provided to the customer at the remote location so that the documents will be routed to the CSR and so the customer does not have to fill out a form. For example, a FedEx® label or fax transmittal cover sheet can be printed out via the printer at the remote location and attached to the package to be mailed or faxed with routing information thereon to direct it to the CSR.

In some embodiments, the received document can be saved by the CSR to a document storage area (e.g., within or in communication with the company communication system) and executable instructions can be provided to allow other CSR's to access the documents in real time, so there is little to no time delay in providing this information to the other CSR's.

Method embodiments of the present disclosure can be implemented via computer executable instructions in the form of software, hardware, and/or firmware, or a combination thereof. In the above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure.

It is to be understood that the above description has been made in an illustrative fashion, and not a restrictive one. Combination of the above examples, and other examples not specifically described herein will be apparent to those of skill in the art upon reviewing the above description.

The scope of the one or more examples of the present disclosure includes other applications in which the above structures and methods are used. Therefore, the scope of one or more examples of the present disclosure should be determined with reference to the appended claims, if provided, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures attempt to follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

In Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   at least one processor; and
   memory comprising instructions that when executed by the at least one processor cause the processor to perform operations comprising:
   storing, at a communication system, different device types available at remote locations in advance;
   establishing a communication session between a first device and a second device of a user, wherein the first device is at a particular remote location relative to the second device, wherein establishing the communication session comprises:
   looking up a type of the first device at the communication system for the communication session, and
   transmitting the type of the first device to the second device of the user; and
   providing the second device of the user with remote control over the first device such that the second device is capable of causing the first device to:
   capture content from a document to obtain captured content,
   add, to the captured content, a session identifier identifying the communication session and identification information of the user, and
   transmit the captured content comprising the session identifier and the identification information to the second device of the user.

2. The system of claim 1, wherein the first device available at the remote location is a camera, a printer, a scanner, a fax machine, or a personal computing device.

3. The system of claim 1, wherein the remote location is a bank or a retail store.

4. The system of claim 1, wherein the operations further comprise providing the second device of the user with control over the first device such that the second device is capable of (i) changing a resolution of images to be captured by the first device, (ii) changing exposure of the first device, (iii) selecting a grayscale image option or a color image option, or combinations thereof.

5. The system of claim 1, wherein the content from the document comprises an image of the document.

6. The system of claim 1, wherein the content from the document includes data derived from an image of the document.

7. The system of claim 1, wherein the operations further comprise providing the second device of the user with remote control over the first device such that the second device is capable of causing the first device to add at least one of a header or a code to the captured content.

8. The system of claim 7, wherein the code includes an alpha numeric code.

9. A method comprising:
   storing, at a communication system, different device types available at remote locations in advance;
   establishing a communication session between a first device and a second device of a user, wherein the first device is at a particular remote location relative to the second device, wherein establishing the communication session comprises:
   looking up a type of the first device at the communication system for the communication session, and
   transmitting the type of the first device to the second device of the user; and providing the second device of the user with remote control over the first device;

capturing, by the first device and in response to control instructions from the second device, content from a document to obtained captured content;

adding, by the first device and in response to control instructions from the second device, to the captured content, a session identifier identifying the communication session and identification information of the user; and transmitting the captured content comprising the session identifier and the identification information to the second device of the user.

10. The method of claim 9, wherein the first device available at the remote location is one of a camera, a printer, a scanner, a fax machine, or a personal computing device.

11. The method of claim 9, wherein the remote location is a bank or a retail store.

12. The method of claim 9, wherein the content from the document includes an image of the document.

13. The method of claim 9, wherein the content from the document includes data derived from an image of the document.

14. The method of claim 9, further comprising providing the second device of the user with remote control over the first device such that the second device is capable of causing the first device to add at least one of a header or a code to the captured content.

15. One or more non-transitory computer readable media coupled to at least one computing device having computer readable instructions stored thereon which, when executed by the at least one computing device, cause the at least one computing device to perform operations comprising:

storing, at a communication system, different device types available at remote locations in advance;

establishing a communication session between a first device and a second device of a user, wherein the first device is at a particular remote location relative to the second device, wherein establishing the communication session comprises:

looking up a type of the first device at the communication system for the communication session, and transmitting the type of the first device to the second device of the user; and providing the second device of the user with remote control over the first device;

capturing, by the first device and in response to control instructions from the second device, content from a document to obtained captured content;

adding, by the first device and in response to control instructions from the second device, to the captured content, a session identifier identifying the communication session and identification information of the user; and transmitting the captured content comprising the session identifier and the identification information to the second device of the user.

16. The one or more non-transitory computer readable media of claim 15, wherein the first device available at the remote location is one of a camera, a printer, a scanner, a fax machine, or a personal computing device.

17. The one or more non-transitory computer readable media of claim 15, wherein the instructions further include instructions to provide the second device of the user with control over the first device such that the second device is capable of (i) changing a resolution of images to be captured by the first device, (ii) changing exposure of the first device, (iii) selecting a grayscale image option or a color image option, or combinations thereof.

* * * * *